US011111140B2

(12) United States Patent
Collins

(10) Patent No.: US 11,111,140 B2
(45) Date of Patent: Sep. 7, 2021

(54) APPARATUS FOR GENERATING HYDROGEN

(71) Applicant: IHOD LIMITED, Sunningdale (GB)

(72) Inventor: Mark Collins, Chichester (GB)

(73) Assignee: IHOD LIMITED, Chichester (GB)

( * ) Notice: Subject to any disclaimer, the term of this patent is extended or adjusted under 35 U.S.C. 154(b) by 596 days.

(21) Appl. No.: 15/751,525

(22) PCT Filed: Aug. 11, 2016

(86) PCT No.: PCT/EP2016/069111
§ 371 (c)(1),
(2) Date: Feb. 9, 2018

(87) PCT Pub. No.: WO2017/025591
PCT Pub. Date: Feb. 16, 2017

(65) Prior Publication Data
US 2018/0230007 A1 Aug. 16, 2018

(30) Foreign Application Priority Data

Aug. 12, 2015 (GB) ..................... 1514216
May 26, 2016 (GB) ..................... 1609292

(51) Int. Cl.
C01B 3/08 (2006.01)
B01J 19/18 (2006.01)
C01B 3/06 (2006.01)

(52) U.S. Cl.
CPC .......... C01B 3/08 (2013.01); B01J 19/18 (2013.01); C01B 3/06 (2013.01); B01J 2219/00162 (2013.01); Y02E 60/36 (2013.01)

(58) Field of Classification Search
CPC ...................................... C01B 3/08
(Continued)

(56) References Cited

U.S. PATENT DOCUMENTS 4,325,355 A 4/1982 Houser
4,406,666 A 9/1983 Paschen et al.
(Continued)

FOREIGN PATENT DOCUMENTS

CN 101381073 A 11/2009
CN 202094218 U 12/2011
(Continued)

OTHER PUBLICATIONS

International Search Report for International Application No. PCT/EP2016/06911, filed Aug. 11, 2016, dated Oct. 24, 2016.
(Continued)

Primary Examiner — Douglas B Call
(74) Attorney, Agent, or Firm — Heslin Rothenberg Farley & Mesiti P.C.

(57) ABSTRACT

The invention provides an apparatus for generating hydrogen including first and second reactant containers linked to a reactor vessel. The reactant containers contain reactants which, when mixed in the reactor vessel, react to form hydrogen gas. Peristaltic pumps pump the reactants from the reactant containers to the reactor vessel. The peristaltic pumps are selected to provide a maximum pumping pressure in the range from 0.1 bar to 10 bar. An electronic control means is programmed to control the flow of reactants to the reactor vessel so as to maintain the pressure of hydrogen gas within the apparatus at a value of no more than 10 Bar.

20 Claims, 11 Drawing Sheets

(58) Field of Classification Search
USPC .................................................. 423/648.1
See application file for complete search history.

(56) References Cited

U.S. PATENT DOCUMENTS

| | | |
|---|---|---|
| 5,902,551 A | 5/1999 | Cowan et al. |
| 2004/0016769 A1 | 1/2004 | Redmon |
| 2005/0244683 A1 | 11/2005 | Otis, Jr. et al. |
| 2006/0174952 A1 | 8/2006 | Curello et al. |
| 2006/0199061 A1* | 9/2006 | Fiebig ............... H01M 8/04291 429/410 |
| 2007/0036711 A1 | 2/2007 | Fisher et al. |
| 2009/0252671 A1 | 10/2009 | Fullerton |
| 2009/0304558 A1 | 12/2009 | Patton et al. |
| 2010/0061923 A1 | 3/2010 | Reddy |
| 2010/0136679 A1 | 6/2010 | Min et al. |
| 2011/0286913 A1* | 11/2011 | Lugtigheid ............ B67D 7/04 423/658.2 |
| 2014/0014205 A1 | 1/2014 | Barton |
| 2015/0207160 A1 | 7/2015 | Masetti-Placci et al. |

FOREIGN PATENT DOCUMENTS

| | | |
|---|---|---|
| EP | 1731665 A1 | 12/2006 |
| EP | 2716598 A1 | 4/2014 |
| EP | 1329972 A1 | 7/2018 |
| GB | 2164637 A | 3/1986 |
| GB | 2489969 A | 10/2012 |
| GB | 2528931 A | 2/2016 |
| JP | 2004210591 A | 7/2004 |
| WO | 2010087698 A2 | 8/2010 |
| WO | 2012140170 A1 | 10/2012 |

OTHER PUBLICATIONS

United Kingdom Search Report for Great Britain Application No. GB1609292.6, dated Jul. 14, 2016.

* cited by examiner

APPARATUS FOR GENERATING HYDROGEN

CROSS REFERENCE TO RELATED APPLICATIONS

This application is a U.S. National Phase filing under 35 U.S.C. § 371 of International Application PCT/EP2016/069111, filed Aug. 11, 2016, and published as WO 2017/025591A1 on Feb. 16, 2017, which claims priority from Great Britain application numbers 1514216.9, filed Aug. 12, 2015, and 1609292.6, filed May 26, 2016. The entire contents of each of these applications are hereby incorporated herein by reference.

This invention relates to a portable apparatus for generating hydrogen at low pressures.

BACKGROUND OF THE INVENTION

In recent years, fuel cells have become increasingly popular as a means of generating electricity in situations where there is no mains power available. Fuel cells typically run on hydrogen and have a number of advantages over petrol- or diesel-fuelled internal combustion engines traditionally used in stand-alone power generators. Thus, the waste product of the operation of a fuel cell run on hydrogen is solely water, and no carbon dioxide or carbon monoxide is produced. Fuel cells are also more efficient than petrol- or diesel-fuelled internal combustion engines. A further advantage of a fuel cell compared to a conventional petroleum burning generator is that fuel cells can be miniaturised, thereby making them more portable. One example of a portable fuel cell is the proton exchange membrane (PEM) fuel cell.

Internal combustion engines using hydrogen as a fuel rather than petrol or diesel have also been developed. Whereas such engines have an advantage over petrol- or diesel-fuelled internal combustion engines in that they produce only water as a waste product, they are nevertheless typically less efficient than fuel cells and are more difficult to miniaturise.

A problem with the use of hydrogen-based fuel cells and hydrogen-fuelled internal combustion engines is that in many remote locations and field situations, a supply of hydrogen may simply be unobtainable. Thus, currently, the use of hydrogen-based fuel cells and hydrogen-fuelled generators is limited by the difficulties in obtaining or maintaining a supply of hydrogen.

It is known that hydrogen can be generated by the reaction of various metals with acid or alkali. For example, U.S. Pat. No. 4,325,355 describes a heating system in which an exothermic reaction between a solid metal and a solution takes place in a reactor containing a heat exchanger. In the specific reaction system described, aluminium pieces are lowered into a solution of sodium hydroxide solution. During the reaction between aluminium and sodium hydroxide solution, the aluminium is converted to aluminium hydroxide with the evolution of hydrogen gas. The aluminium hydroxide reacts with the sodium hydroxide to form sodium aluminate.

The generation of hydrogen by the reaction of aluminium with sodium hydroxide is also described in US patent application US2009/0252671 (Fullerton).

International patent application WO2012/140170 (Collins) discloses an apparatus for heating a liquid, for example in a domestic water heating system. The apparatus of WO2012/140170 is intended to produce heat and provides an alternative to heating systems making use of electricity or the burning of fossil fuels. Heat is produced by the exothermic reaction of sodium hydroxide and aluminium and the heat is then harvested by means of a heat exchanger on or in the reaction vessel. Further heat is produced by burning the hydrogen generated by the reaction.

The hydrogen generating apparatuses of the type described above are relatively large scale fixed installations that are not readily suited to portable use.

CN 101381073 A (Tianjin Highland Energy discloses a hydrogen producing device which produces hydrogen by reacting an aluminium slurry with an alkali. The flow rate of reactants entering the reaction zone appears only to be controlled by a pressure regulating device. Reliance on a single means for controlling the flow of reactants into the reaction zone could result in dangerously high levels of hydrogen being generated in the event of a malfunction of the pressure regulating device JP 2004210591 A (ITEC) discloses an apparatus for the generation of hydrogen from the reaction of aluminium and sodium hydroxide. However, the pressure of generated hydrogen gas is in excess of 50 atm ($5 \times 10^6$ Pa). High pressure hydrogen may be unsuitable for some uses as it requires pressurised hydrogen storage capability and is potentially more hazardous in use.

At present, there remains a need for an apparatus which can provide hydrogen on demand in remote or field situations where it is not possible or practicable to use hydrogen storage containers such as gas cylinders.

There is also a need for an apparatus of the aforesaid type that is portable and is sufficiently light to be capable of being lifted, or moved from one location to another, by one or two persons of average strength

SUMMARY OF THE INVENTION

The present invention provides an apparatus (typically a portable apparatus) for generating hydrogen on demand at low pressures: for example the pressures typically required for fuel cells (which in some embodiments can be 10 bar ($10 \times 10^5$ Pa) or less, for example no more than 3-5 bar ($3\text{-}5 \times 10^5$ Pa), and in other embodiments can be 0.3 to 3 Bar ($0.3\text{-}3 \times 10^5$ Pa). By providing hydrogen on demand at low pressures, the need for pressurised hydrogen storage capability is avoided thereby providing an apparatus which is potentially safer to use.

In a first aspect, the invention provides an apparatus for generating hydrogen; the apparatus comprising:

(a) a reactor vessel;

(b) first and second reactant containers linked to the reactor vessel, the first and second reactant containers containing, respectively, first and second reactants which, when mixed, react to form hydrogen gas;

(c) one or more pumps for pumping the first and second reactants from the reactant containers to the reactor vessel so that the reactants mix and react to form hydrogen gas;

(d) a buffer tank for receiving hydrogen gas from the reactor vessel;

(e) a pressure sensor for measuring pressure of hydrogen gas within the apparatus; and (f) electronic control means for controlling operation of the apparatus, the electronic control means being in communication with the one or more pumps and the pressure sensor and being programmed to control the flow of reactants to the reactor vessel so as to maintain the pressure of hydrogen gas within the apparatus at a value of no more than 10 bar ($10 \times 10^5$ Pa).

In another aspect, the invention provides an apparatus for generating hydrogen; the apparatus comprising:
(a) a reactor vessel having one or more reactant inlets through which first and second reactants can enter the reactor vessel, the first and second reactants being such that, when mixed, they react to form hydrogen gas;
(c) one or more pumps for pumping the first and second reactants from reactant containers containing the said first and second reactants to the reactor vessel; (d) a buffer tank for receiving hydrogen gas from the reactor vessel;
(e) an optional pressure sensor for measuring pressure of hydrogen gas within the apparatus; and
(f) electronic control means for controlling operation of the apparatus, the electronic control means being in communication with the one or more pumps and the pressure sensor and being programmed to control the flow of reactants to the reactor vessel;
wherein the apparatus is set up so that when the pressure of hydrogen gas reaches a predefined value, the pumping of either or both of the first and second reactants to the reactor is prevented;
the said predefined value being a pressure in the range from 0.1 bar to 10 bar ($10 \times 10^3$ Pa to $10 \times 10^5$ Pa).

The reactant containers can form part of the apparatus, or they can be supplied separately and connected to the apparatus as required.

The buffer tank (d) serves to smooth out fluctuations in the pressure of hydrogen within the apparatus. This provides an advantage over known hydrogen generation apparatus that it ensures that a reasonably constant desired hydrogen pressure can be maintained. During the operation of the apparatus, the buffer tank is typically in open communication with the reactor vessel interior; i.e. there are no one way valves between the reactor vessel and buffer tank, and any valves that are present are set to the open position. Thus, any hydrogen generated in the reactor vessel can pass freely between the reactor vessel and the buffer tank. In this way, fluctuations in the pressure of hydrogen gas within the reactor vessel following the introduction of reactants can be absorbed by the buffer tank.

The buffer tank typically has a volume which is at least as great as the volume of the reactor vessel, the term "volume" referring to the internal volume of the buffer tank or reactor vessel as appropriate. More usually, the buffer tank will have a volume which is at least 1.5 times the volume of the reactor vessel, or at least 1.75 times the volume of the reactor vessel, or at least 2 times the volume of the reactor vessel. For example, the volume ratio of the buffer tank:reactor vessel may be in the range from 1:1 to 4:1, or from 1:1 to 3:1, or from 1.5:1 to 2.5:1, or from 1.75:1 to 2.25:1.

A pressure sensor (e) is typically provided which monitors (e.g. measures) the pressure of hydrogen gas within the apparatus. The pressure sensor can be located, for example, in the buffer tank or in pipework between the reactor vessel and the buffer tank. The pressure sensor communicates (either through electrical wiring or wirelessly) with the electronic control means (f) which in turn communicates with the pump or pumps (c). Using the electronic control means (f), a desired hydrogen pressure is selected and the pumps (c) operate to provide a flow of reactants into the reactor vessel sufficient to give the desired pressure of hydrogen. If the sensor indicates that the pressure has fallen below the desired value, more reactants are pumped into the reactor vessel. Conversely, if the pressure of hydrogen exceeds the desired value, the flow of reactants to the reactor vessel can be interrupted until the pressure has fallen back to the desired value.

Alternatively, or additionally, the pumps can be selected or set to provide a maximum pumping pressure which corresponds to a predefined value for the pressure of hydrogen gas within the apparatus. With such an arrangement, once the pressure of hydrogen gas in the apparatus reaches the predefined value, the pumps are unable to pump any more reactants into the reactor. In accordance with the invention, the maximum pumping pressure is in the range from 0.1 bar to 10 bar ($10 \times 103$ Pa to $10 \times 105$ Pa). In this arrangement, the pressure sensor (e) may, if desired, be omitted.

The apparatus is designed to generate hydrogen on demand; i.e. as the hydrogen is generated, it is delivered to a hydrogen consuming device connected to, or forming part of, the apparatus. The apparatus of the invention is not intended to store large amounts of hydrogen, although some hydrogen is typically retained in the buffer tank between uses. This residual hydrogen may be used to generate energy required to start up the apparatus. For example, the buffer tank may be connected to an on-board fuel cell (e.g. PEM cell) or generator to generate electricity to power the pumps (c), electronic control means (f) and any other on-board power consuming components such as a motorised stirrer.

The electronic control means is programmed to control the flow of reactants to the reactor vessel so that the pressure of hydrogen gas within the apparatus does not exceed 10 bar ($10 \times 105$ Pa). More typically, the electronic control means is programmed so that the pressure of hydrogen gas within the apparatus does not exceed 5 bar ($5 \times 105$ Pa).

In various embodiments (depending on the operating pressure of the hydrogen-consuming device forming part of, or connected to the apparatus), the electronic control means is programmed so that the pressure of hydrogen gas within the apparatus is in the range from:
(i) 0.5 Bar to 5 Bar ($0.3 \times 10^5$ Pa to $3 \times 10^5$ Pa); or
(ii) 2 bar ($2 \times 10^5$ Pa) to 4 bar ($4 \times 10^5$ Pa): or
(v) 2.5 bar ($2.5 \times 10^5$ Pa) to 3.5 bar ($3.5 \times 10^5$ Pa).

When the hydrogen-consuming device is a PEM fuel cell, a pressure reducing valve may be provided to reduce the pressure of hydrogen entering the PEM cell from the pressure within the apparatus to a value of about 0.5 Bar.

The apparatus is typically provided with at least one temperature sensor (g) as well as the pressure sensor (e) (when present). The temperature sensor is also in communication (through electrical wiring or wirelessly) with the electronic control means (g).

Where a temperature sensor is provided, the electronic control means (g) may be programmed to control the flow of reactants to the reactor vessel so that a defined temperature parameter of the apparatus does not exceed a pre-determined value.

The defined temperature parameter may be, for example, the temperature inside the reactor vessel. Alternatively, the defined temperature parameter may the external surface temperature of the reactor vessel.

The reactor vessel is formed from a material which is resistant to the chemical reactants and reaction products, does not corrode to any significant extent, and is substantially impermeable to hydrogen gas. The reactor vessel is constructed so that it can withstand the pressures of hydrogen gas generated therein.

Typically, the reactor vessel is formed from a metallic material such as stainless steel or another iron alloy, preferably a corrosion resistant iron alloy. In order to provide enhanced resistance to corrosion, the reactor vessel may be lined with an inert material such as PTFE.

Preferably the reactor vessel is formed from stainless steel.

When the reactor vessel is formed from a metallic material, heat generated by the chemical reaction will be conducted to the external surfaces of the reactor vessel. A temperature sensor mounted on the external surface of the reactor vessel will therefore provide a good indication of the temperature inside the reactor vessel.

The reactor vessel is typically provided with a stirrer or other means for ensuring mixing of the reactants. For example, a motorised stirrer may be provided. The stirrer may be mounted in an upper part of the reactor vessel. In one embodiment, a stirrer is mounted in an upper part of the reactor vessel, the stirrer having a motor removably attached thereto, whereby the motor can be removed and replaced by means (e.g. a crank handle) for manually operating the stirrer.

The reactor vessel is typically provided with a sump section for collecting reaction products or unreacted or partially reacted reactants.

The sump section can be configured to be separable from an upper body section of the reactor vessel to allow access to the reactor vessel interior for cleaning and maintenance purposes. The sump section can alternatively or additionally be provided with a sump outlet (e.g. at or towards its lower end) for removing reaction products and/or unreacted or partially reacted reactants.

Alternatively, the reactor vessel may be provided with a waste outlet for removing reaction products and/or unreacted or partially reacted reactants.

The sump or waste outlet may be linked to a recycling conduit for recycling reaction mixtures and reaction products from the sump back into the reactor vessel (e.g. through an opening higher than the waste outlet). Alternatively, the waste outlet may be linked to a waste container, where waste material can be stored until the container is emptied by the user.

A further pump (e.g. a peristaltic pump) may be provided for moving reaction mixture along the recycling conduit. The said further pump is typically connected (by electrical wiring or wirelessly) to the electronic control means (g).

The recycling conduit allows the reaction mixture to be recycled from the sump or waste container back into the reactor vessel thereby enabling reaction to take place with any unreacted or partially reacted reactants in the waste stream. The recycling conduit may be provided with one or more reaction parameter sensors (e.g. a pH meter) for measuring a parameter indicative of the progress of the reaction inside the reactor vessel. The reaction parameter sensors, when present, typically communicate (e.g. by electrical wiring or wirelessly) to the electronic control means (f). A valve (e.g. a motorised valve) may be provided to allow the reaction mixture to be directed through the waste outlet. The electronic control means (f) can be programmed to activate one or more of the pumps (c) to introduce further reactant into the reactor vessel if the reaction parameter (e.g. pH) reaches or goes beyond a certain value.

The electronic control means (f) can be programmed such that, when a reaction parameter (e.g. pH) measured by the reaction parameter sensor indicates that the reaction has gone to completion, or as far towards completion as is judged to be acceptable, the sump or waste outlet is opened and the reaction products are allowed to pass to waste. The electronic control means may also be referred to herein for convenience as "the electronic controller (f)".

The reactor vessel may comprise an upper reactor body section and a sump section, the upper reactor body section and the sump section being sealingly (e.g. by means of a sealing gasket therebetween) connected together. The upper reactor body section and the sum section may be provided with mating flanges which can be connected together with flange bolts or a flange clamp (for example a Klein® flange clamp.

The apparatus may comprise a casing (h), wherein the reactor vessel (a), the first and second reactant containers (b), the one or more pumps (c), the pressure sensor (e), the electronic control means (f) and optionally the buffer tank (d) are all contained within the casing (h).

The casing (h) may be entirely opaque so that the working components of the apparatus are concealed. Alternatively, the casing may have one or more windows or transparent sections to enable at least some of the working components to be seen.

The casing prevents or restricts the ingress of dust, dirt, moisture and other elements to which the apparatus may be exposed in use, for example in field situations.

The apparatus is preferably portable.

The term "portable" as used herein refers to an apparatus having a weight and dimensions that enable it to be moved (e.g. rolled or lifted and carried) comfortably by one or two people of average strength. Thus, for example, a portable apparatus of the invention can weigh up to about 150 kg when empty of reactants. More typically, the portable apparatus will have an empty weight of up to 140 kg, for example up to 135 kg or up to 130 kg. In one embodiment, the apparatus has an empty weight of 25 kg to 30 kg. In another embodiment, the apparatus has an empty weight of up to 25 kg or up to 20 kg, or up to 15 kg.

The dimensions of the portable apparatus of the invention may be such that it has a maximum width of up to 1.5 metres, a maximum length of up to 1.5 metres and a maximum height of up to 1.5 metres. More usually, the dimensions of the portable apparatus of the invention may be such that it has a maximum width of up to 1 metre, a maximum length of up to 1 metres and a maximum height of up to 1 metre.

The apparatus may have an outer casing that is shaped to allow the apparatus to be rolled. For example, the casing may have a substantially spherical or cylindrical shape.

The reactor vessel (a), the first and second reactant containers (b) may be mounted on the buffer tank (d). For example, they can each be mounted on top of the buffer tank, the term "top" referring to the orientation when the apparatus is in use. Thus, the buffer tank may serve as a base for the apparatus.

The apparatus may comprise first and second reactant containers (b) containing, respectively, first and second reactants which, when mixed, react to form hydrogen gas. There may optionally be one or more further containers containing reactants.

The first and second reactants are typically provided in a liquid form to facilitate pumping to the reactor vessel. For example, the first and second reactants can be provided in the form of solutions and/or suspensions.

The first and second reactants can be any substances that react with each other to generate hydrogen.

For example, the first reactant can take the form of a metal (e.g. a finely divided metal such as metal granules or a metal powder) that reacts with an acid or an alkali to form hydrogen.

The metal can be, for example, an alkali metal or alkaline earth metal, a group III metal such as aluminium, a non-transition metal such as zinc, or a transition metal.

The metal is typically sufficiently finely divided that it can be suspended in a carrier liquid (e.g. water), typically with a suspending agent or suspension stabilizer.

The suspending agent or suspension stabilizer prevent (or reduce the likelihood of) the metal settling out of suspension. By maintaining a stable suspension, it is possible to provide more accurately metered amounts of the reactant to the reactor vessel.

The suspending agent can be, for example, a cellulose or starch-based suspending agent or a polysaccharide gum. Such suspending and stabilizing agents are well known in the fields of pharmaceutical and paint technology. The suspensions may contain one or more biocidal components such as polymeric biguanide and N-butyl-1,2-benzisothiazolin-3-one.

The second reactant can be, for example, an acid or an alkali.

Examples of acids include carboxylic acids such as citric acid and tartaric acid, or mineral acids such as sulphuric acid and hydrochloric acid.

Examples of alkalis include aqueous solutions of alkali metal hydroxides such as sodium and potassium hydroxide.

In one particular embodiment, the first reactant comprises a suspension of a metal powder such as zinc or aluminium and the second reactant comprises an aqueous alkali metal hydroxide.

A particular pair of reactants that may be used to generate hydrogen comprises a suspension of finely divided aluminium as the first reactant and aqueous sodium hydroxide as the second reactant.

The apparatus comprises one or more pumps (c) for directing metered amounts of the first and second reactants to the reactor vessel. Typically, each reactant container (b) has its own pump.

The pumps may be configured such that if the pressure inside the reactor should exceed a predetermined value, the pumps can no longer pump reactant into the reactor. Therefore, if the electronic controller for the apparatus should fail, the pumps will nevertheless be stopped from pumping additional reactant into the reactor (removing the need for blow-out values). The pumps can be, for example, peristaltic pumps.

Thus, in one embodiment, the pumps (c) are configured so that they have a maximum pumping pressure no greater than a required pressure of hydrogen as defined herein. In a particular embodiment, the pumps are configured so that they have a maximum pumping pressure of no more than 3 Bar.

The reaction between the first and second reactants is typically exothermic and the heat produced by the reaction will typically cause evaporation of water in the reaction mixture. The stream of hydrogen gas leaving the reactor vessel will therefore typically contain water vapour, as well as possibly fine particles of fuel material.

One or more dryer units (dewatering units) (i) may therefore be provided for removing water vapour and possibly suspended fine solid fuel particles from the hydrogen stream before it enters the buffer tank.

In one embodiment, there may be more than one dryer unit (i). For example, the apparatus may comprise two dryer units (i) in series mounted in the tubing between the reactor vessel and the buffer tank (d). A first of the dryer units (i.e. the nearest to the reactor vessel) may be arranged to remove the greater part of any water in the hydrogen gas stream and a second of the dryer units (i.e. the nearest to the buffer tank) may be arranged to remove the remainder (or most of the remainder) of any water in the hydrogen gas stream. The first and second dryer units may be of different types. For example, the first dryer unit may be a first stage water trap which traps moisture from the cooling hydrogen gas and the second dryer unit may contain a desiccant which absorbs the finer moisture particles from the hydrogen gas.

In another embodiment, there is only a single dryer unit (i).

The dryer unit may be omitted in certain circumstances, for example when the apparatus is used in conjunction with fuel cells or other electricity generators that tolerate or benefit from the use of moist hydrogen gas.

The apparatus may also comprise a heat exchanger/separator unit mounted in-line with the reactor vessel (for example upstream of the one or more dryer units), the heat exchanger/separator serving to cool the hydrogen gas emerging from the reactor vessel and allow any solid-fuel particles entrained in the gas to settle out before entering the dryer(s).

The apparatus may comprise one or more pressure relief valves. For example, a pressure relief valve may be located between the reactor vessel and any dryer units. The pressure relief valve is typically set up to vent hydrogen to the atmosphere if the hydrogen pressure generated in the pipework exceeds a predetermined value. In ordinary usage, the pressure relief valve will not be necessary, and particular is not needed when the pumping pressures of the pumps are set to a maximum of no more than 3 Bar. However, in the event of any failure of the pressure sensor (e) and/or the electronic control means (f) to bring pressure under control, the pressure relief valve, if present, provides an additional level of safety. In general, however, because the apparatus is configured to generate only relatively low pressures of hydrogen (preferably up to 3 Bar), the pressure relief valve may be omitted.

In one general embodiment of the invention, when the pumping pressures of the pumps are set to a maximum of no more than 3 Bar, the apparatus has no pressure relief valves.

An electronic control means (electronic controller) is provided for controlling and/or monitoring the operation of the apparatus. The electronic control means controls the flow of reactants into the reactor vessel. The electronic control means is linked to the pressure sensor (e) when present, the temperature sensor (g) when present, and the one or more pumps (c).

The electronic control means may be linked to or include an output device enabling data gathered by the control means to be accessed. For example, the output device can be a visual display (e.g. a visual display unit) which may conveniently be mounted on the casing (h).

The electronic control means preferably enables the user of the apparatus to select and/or vary one or more operating parameters of the apparatus. For example, the electronic control means can be used to select the pressure of hydrogen delivered by the apparatus and/or the time period over which the hydrogen is generated. Therefore, the electronic control means typically comprises a means for inputting data and/or instructions. The inputting means can comprise a keyboard or keypad or a virtual keyboard or keypad presented on a touch screen visual display unit.

The apparatus of the invention is typically provided with an on-board electrical power supply or power supply inlet (j) to provide electrical power for the one or more pumps, motorized stirrers when present, the electronic control means (f) and any other electricity-consuming devices forming part of the apparatus. The power supply may, for example take the form of a fuel cell or hydrogen-consuming electricity generator and/or one or more batteries. The fuel cell or generator can generate power to start up the apparatus using residual hydrogen in the buffer tank. Alternatively or additionally, any electrical power needed to start up the apparatus can be provided from batteries. On-board batteries can be recharged by diverting a proportion of the hydrogen generated by the apparatus through the fuel cell or on-board generator during operation.

The apparatus of the invention may be connected to an external device (e.g. a portable or handheld device) that consumes hydrogen. Alternatively, the apparatus may be connected to a device that consumes hydrogen which is located inside the casing for the apparatus. For example, the apparatus may be connected to a fuel cell, or to a generator comprising a hydrogen-powered internal combustion engine. The fuel cell is typically a portable fuel cell such as a proton exchange membrane (PEM) fuel cell.

Thus, in a further aspect, the invention provides an apparatus as defined herein in combination with a device that consumes hydrogen, for example a hydrogen-consuming device that consumes hydrogen, such as a fuel cell, e.g. a PEM fuel cell, or a generator.

The apparatus may also comprise a cooling device such as a fan to prevent the apparatus from overheating. The casing may therefore also be provided with air escape holes to allow for circulation of air within the casing to allow for effective cooling.

The electronic controller is programmed to control the flow of reactants to the reactor vessel so that the pressure of hydrogen gas within the apparatus does not exceed 10 bar ($10 \times 10^5$ Pa) and is typically within a range as defined above. In one embodiment, the apparatus of the invention may be configured and/or programmed to provide hydrogen gas pressures (e.g. of up to 5 bar ($3 \times 10^5$ Pa), for example from 0.5 Bar to 3 Bar ($0.2 \times 10^5$ to $3 \times 10^5$ Pa); or from 1.5 to 2.5 bar ($1.5 \times 10^5$ to $2.5 \times 10^5$ Pa), or 1.75 to 2.25 bar ($1.75 \times 10^5$ to $2.25 \times 10^5$ Pa)) that are particularly suitable for fuel cells. When a PEM fuel cell is used, a pressure reducer may be provided to reduce the hydrogen pressure to a value of no more than about 0.5 Bar.

The apparatus may be configured and/or programmed to provide hydrogen at a predetermined or selected substantially constant pressure, for example in order to match the desired pressure input requirement for a linked device such as a fuel cell; e.g. a PEM fuel cell.

The invention also provides an apparatus for generating hydrogen; the apparatus comprising:
(a) a reactor vessel;
(b) first and second reactant containers linked to the reactor vessel, the first and second reactant containers containing, respectively, first and second reactants which, when mixed, react to form hydrogen gas;
(c) one or more pumps for pumping the first and second reactants from the reactant containers to the reactor vessel so that the reactants mix and react to form hydrogen gas, the pumps being selected or set to provide a maximum pumping pressure in the range from 0.1 bar to 10 bar;
(d) a buffer tank for receiving hydrogen gas from the reactor vessel;
(e) a pressure sensor for measuring pressure of hydrogen gas within the apparatus; and
(f) electronic control means for controlling operation of the apparatus, the electronic control means being in communication with the one or more pumps and the pressure sensor and being programmed to control the flow of reactants to the reactor vessel so as to maintain the pressure of hydrogen gas within the apparatus at a value of no more than 10 bar ($10 \times 10^5$ Pa).

The invention also provides an apparatus for generating hydrogen; the apparatus comprising:
(a) a reactor vessel having one or more reactant inlets through which first and second reactants can enter the reactor vessel, the first and second reactants being such that, when mixed, they react to form hydrogen gas;
(c) one or more pumps for pumping the first and second reactants from reactant containers containing the said first and second reactants to the reactor vessel, the pumps being selected or set to provide a maximum pumping pressure in the range from 0.1 bar to 10 bar;
(d) a buffer tank for receiving hydrogen gas from the reactor vessel;
optionally (e) a pressure sensor for monitoring pressure of hydrogen gas within the apparatus; and
(f) an electronic controller for controlling operation of the apparatus, the electronic controller being in communication with the one or more pumps and, when present, the pressure sensor and being programmed to control the flow of reactants to the reactor vessel;
wherein the apparatus is set up so that when the pressure of hydrogen gas reaches a predefined value, the pumping of either or both of the first and second reactants to the reactor is prevented;
the said predefined value being a pressure in the range from 0.1 bar to 10 bar ($10 \times 10^3$ Pa to $10 \times 10^5$ Pa).

The apparatus and fuel cell combinations are of particular use in situations where there is no direct access to electricity. They may be used, for example, in field situations to charge devices such as computers, mobile phones and other portable electronic devices and to provide fuel for generators.

The invention will now be illustrated in more detail (but not limited) by reference to the specific embodiment shown in the accompanying drawings.

DETAILED DESCRIPTION OF THE INVENTION

Figure 1:
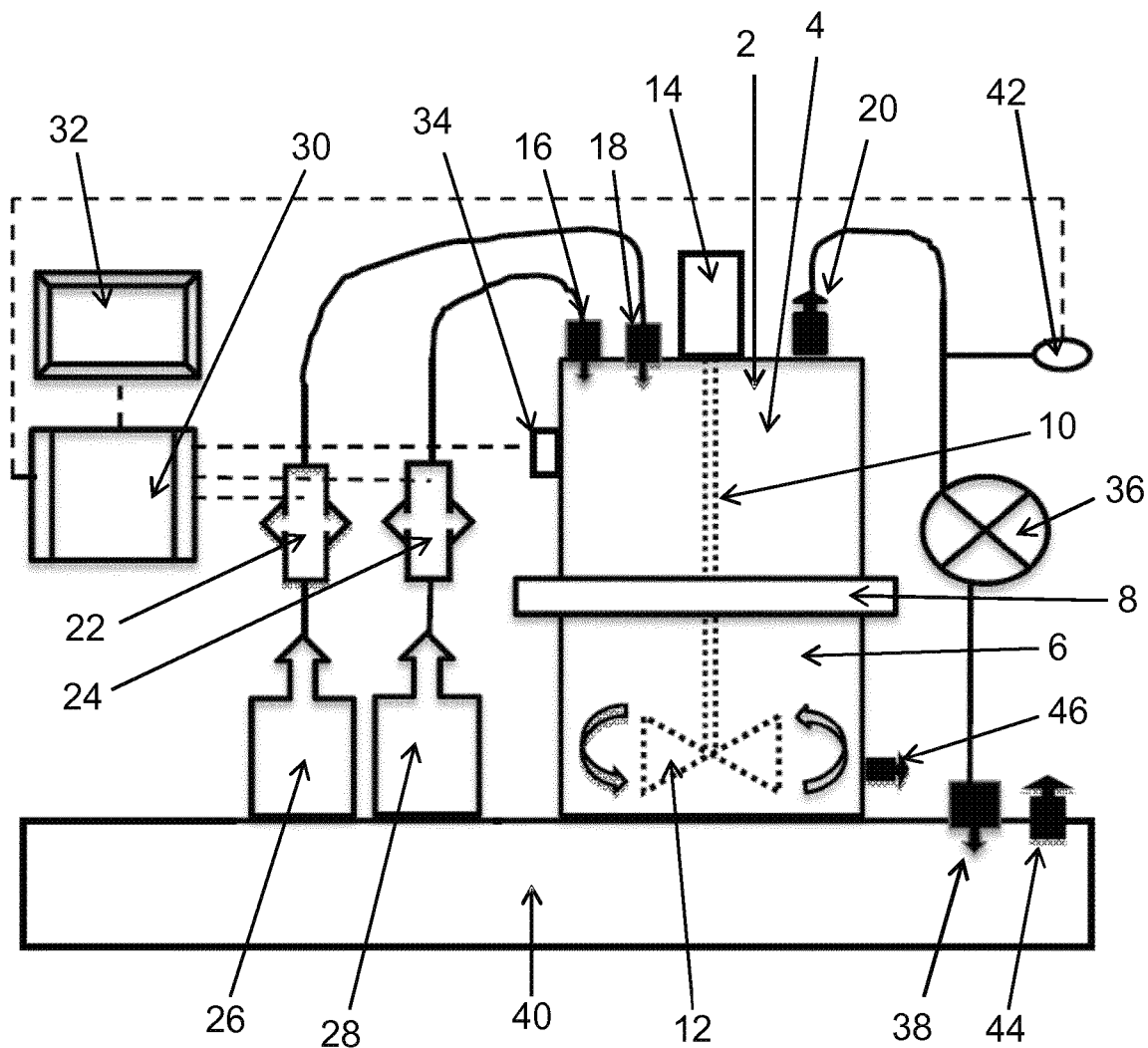
FIG. 1 is a schematic view of an apparatus according to a first embodiment of the invention.
Figure 2:
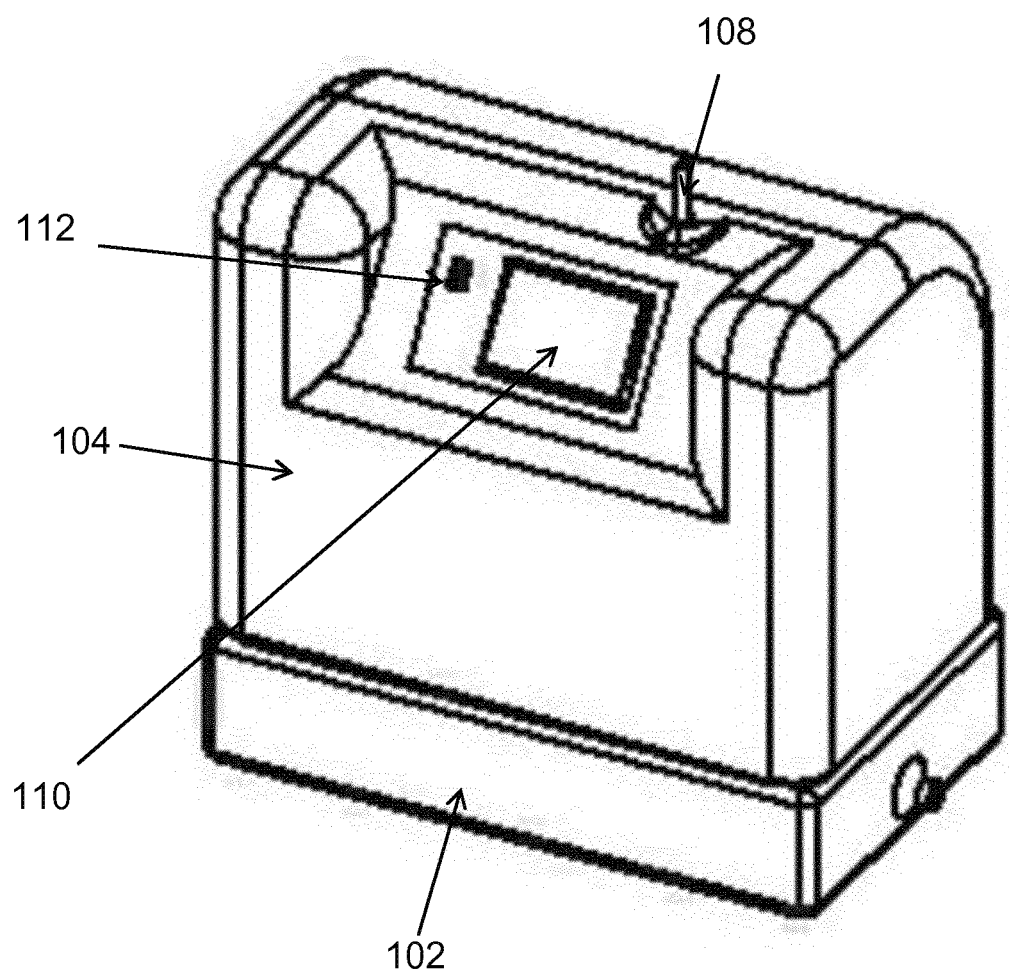
FIG. 2 is a perspective view of an apparatus according to a second embodiment of the invention.
Figure 3:
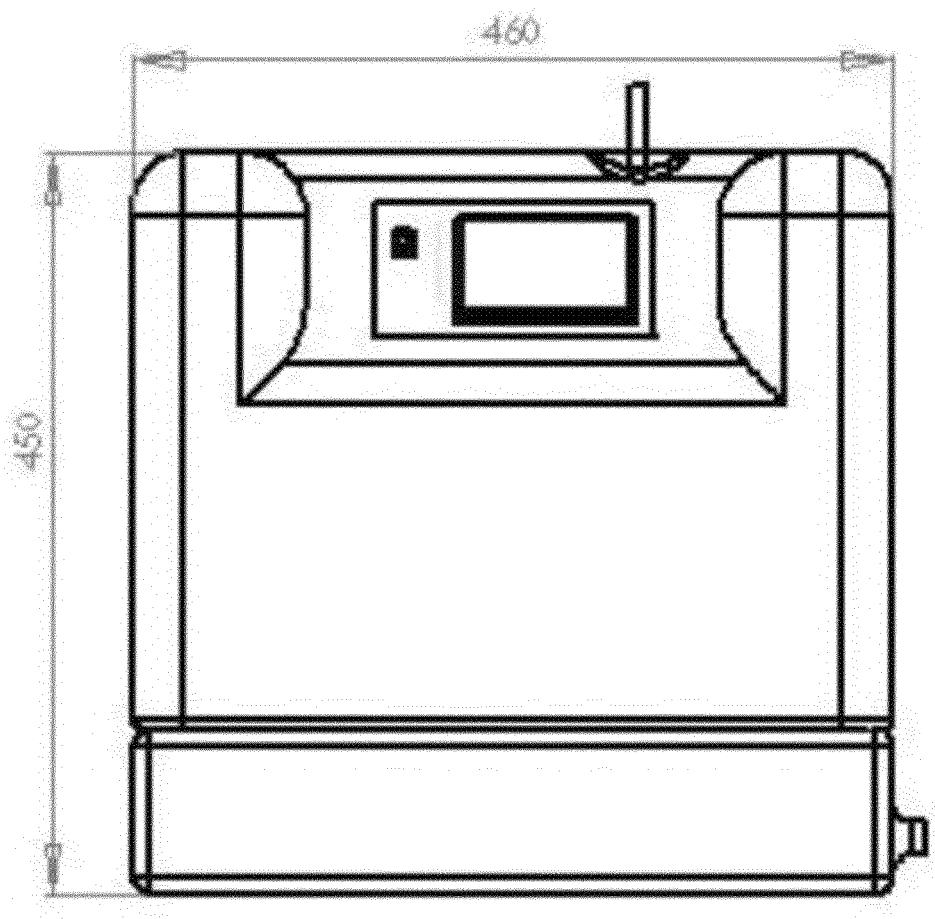
FIG. 3 is a view from one side of the apparatus of FIG. 2.
Figure 4:
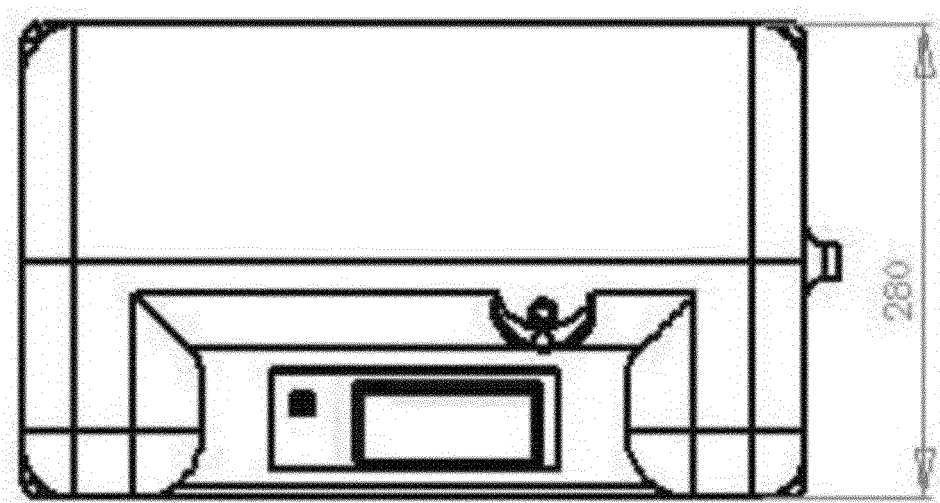
FIG. 4 is a view from above of the apparatus of FIGS. 2 and 3.

FIG. 1 is a schematic illustration of an apparatus according to a first embodiment of the invention. The apparatus comprises a reactor vessel 2 comprising an upper reactor section 4 and a lower sump section 6 both formed from 304L stainless steel. The upper and lower sections of the reactor vessel are provided with abutting flanges which are secured together by means of a releasable flange clamp 8. The flange and flange clamp arrangement may take the form of an ISO quick release flange (e.g. a Klein® flange). A gasket (for example a copper gasket or gasket formed from an elastomeric material) is located between the flanges and provides a substantially gas-tight seal. A sump waste outlet 46 is set into the wall of the lower end of the sump section 6 for removing spent reaction products.

Set into the top of the reactor vessel is a gas-sealed stirrer gland in which is rotatably mounted a stirrer shaft 10. The stirrer shaft 10 is provided at its lower end with a stirrer paddle 12. The stirrer paddle is shaped such that the paddle is of a complementary shape to the inside of the reactor vessel and to minimise any space between the stirrer paddle and the inside walls of the reactor vessel without hindering rotation of the paddle. This prevents a build-up of material on the sides or bottom of the reactor vessel as material is constantly scraped from the inner walls of the vessel. Attached to the top of the stirrer shaft 10 is a removable motor 14 which is connected to a power supply (not shown). The motor 14 can be removed and a hand crank attached to the shaft to enable manual operation of the stirrer when necessary.

Also set into the top of the reactor vessel are first and second reactant inlets 16 and 18 and hydrogen gas outlet 20. The first and second reactant inlets are connected via gas-tight tubing to peristaltic pumps 22 and 24 and by further lengths of gas-tight tubing to first and second reactant containers 26 and 28.

The peristaltic pumps 22 and 24 are linked electronically to a programmable computer processing unit (CPU) 30 which in turn is connected to a touch screen electronic interface unit 32. The CPU 30 and electronic interface unit together constitute the electronic controller for the apparatus.

A temperature sensor 34 is attached to the outer surface of the reactor vessel. The temperature sensor 34 is electrically connected to the CPU 30.

The hydrogen gas outlet 20 is connected via gas-tight tubing to a water separator or dryer 36 and then via a further length of gas-tight tubing to an inlet 38 in the wall of buffer tank 40. The water separator or dryer can be a single stage or two stage dryer. A pressure sensor 42 is connected via a short branch to the tubing between the gas outlet 20 and the water separator 36. The pressure sensor is electronically connected to the CPU 30.

The buffer tank 40 is also formed from 304L stainless steel and is constructed so as to withstand internal gas pressures of up to 10 Bar ($10 \times 10^5$ Pa). The buffer tank may have reinforcing ribs to increase the rigidity of the walls of the tank. The internal volume of the buffer tank is typically at least one and a half times, and more usually at least two times, the internal volume of the reactor vessel. The buffer tank 40 has an outlet 44 which can be connected to a hydrogen consuming device such as a generator or fuel cell.

The components shown in FIG. 1 are typically enclosed within a casing (not shown). The buffer tank 40 may be enclosed within the casing or it may form a base upon which the casing is mounted. The touch screen electronic interface unit 32 is mounted on the casing so that it is accessible to the user of the apparatus.

An on-board power supply (not shown) is also mounted within the casing. The power supply provides the necessary electrical power for the peristaltic pumps, stirrer motor and electronic controller and any other electrical power-consuming components in the apparatus. The power supply can take the form of a fuel cell and/or batteries. The fuel cell consumes a proportion of the hydrogen generated during use of the apparatus and can be used to recharge the batteries. At start up, the power needed to operate the pumps and electronic controller can be provided either by batteries or by the fuel cell running on residual hydrogen remaining in the buffer tank after the previous period of use.

In use, the apparatus is switched on at the electronic interface unit 32 and a desired output pressure of hydrogen is selected. If the hydrogen generated by the apparatus is intended for consumption by an external fuel cell, the pressure is typically set to around 3 Bar ($3 \times 10^5$ Pa). Alternatively, the apparatus may be provided with factory settings that automatically select a required output pressure of hydrogen, in which case the starting up step of selecting a desired output pressure of hydrogen can be omitted.

Once the pressure has been set, the peristaltic pumps 22 and 24 pump reactants from the first and second reactant containers 26 and 28 into the reactor vessel 2 through the reactant inlets 16 and 18 where they react together to generate hydrogen.

The reactants can be any of a number of different pairs of reactants that react together to form hydrogen as described above but, in a particular embodiment, one reactant container contains a solution of sodium hydroxide and the other reactant container contains an aqueous suspension of fine aluminium particles and a suspending agent which can be, for example, a polysaccharide such as starch.

Hydrogen generated in the reactor vessel passes out of the hydrogen gas outlet 20 and through the dryer 36, where water is removed from the gas steam, and then to the buffer tank 40. As there are no one-way valves between the reactor vessel and the buffer tank, hydrogen gas can flow freely in both directions. The gas pressure in the system is measured by the pressure sensor 42 and a signal indicative of the pressure is sent to the CPU 30. Once the gas pressure has reached the required value, or a predefined value less than the required pressure, the peristaltic pumps are stopped thereby halting the flow of reactants into the reactor vessel. If no hydrogen is drawn off through the outlet 44, the hydrogen pressure within the reactor vessel, tubing, dryer and buffer tank will equalise. When the outlet 44 is connected to a hydrogen-consuming device, the extraction of hydrogen from the buffer tank will lead to a reduction in gas pressure within the system which will be detected by the pressure sensor 42 and a signal sent to the CPU 30. The peristaltic pumps will then be activated to pump further reactant into the reactor vessel to generate more hydrogen. The feedback loop formed by the pressure sensor, CPU and peristaltic pumps enables a fairly constant hydrogen pressure to be maintained within the apparatus.

The peristaltic pumps are typically configured such that they are not able to pump the reactants once the pressure in the system reaches a given level (i.e. a pressure in a range as defined above). Therefore, should the electronic control system fail and the pressure of hydrogen inside the system rise uncontrollably, the peristaltic pumps are prevented from pumping further reactant into the highly pressurised system. As a result, the pressure of hydrogen within the system is prevented from rising further.

Because the volume of the buffer tank is significantly larger than that of the reactor vessel, fluctuations (e.g. pulses) in hydrogen pressure which may arise after the addition of reactants can be absorbed by the buffer tank so that the pressure of hydrogen supplied to an external hydrogen-consuming device remains constant.

The temperature sensor 34 monitors the external temperature of the reactor vessel during the operation of the apparatus. Since the thermal conductivity properties of the reactor vessel are known or can be determined, measurement of the external surface temperature of the reactor vessel provides a reliable indicator of the temperature within the reactor vessel. Prior to use of the apparatus, the electronic interface unit 32 is used to set a maximum permissible reactor temperature. If the temperature exceeds the maximum permissible temperature in use, the peristaltic pumps are turned off, or down, until the temperature has returned to an acceptable level. Typically, the temperature is set to a value of less than 100° C. so as to avoid boiling or refluxing of the reactants.

During operation of the apparatus, solid waste products typically accumulate in the sump section of the reactor vessel. The waste products can be removed through the waste outlet 46. However, because the waste products in the sump section may be mixed with partially reacted or unreacted reactants, it can be beneficial to recycle the mixture from the waste outlet 46 through a loop of tubing (not shown) and back into the reactor vessel through a recycling inlet (not shown) at a location higher than the waste outlet, in order to maximise the amount of hydrogen obtained from the reactants. The recycling loop may include one or more sensors that measure a reaction parameter indicative of the completeness of the chemical reaction within the reactor vessel. For example, the recycling loop may include a pH meter. The sensors (e.g. the pH meter) are linked to the CPU which can be programmed to vary the relative amounts of reactants pumped to the reactor vessel in response to signals received from the sensors so as to maintain the reaction parameter within a desired range. The recycling loop may include a further pump (e.g. a peristaltic pump) which is linked electronically to the CPU. The CPU may be programmed to permit no further new reactants (or only low levels of new reactants) to be introduced into the reactor vessel when the recycling loop is in operation.

At intervals, the two sections of the reactor vessel can be separated by removal of the flange clamp and the waste products can be mechanically removed from the reactor vessel and in particular the lower sump section. Alternatively or additionally, waste products can be sucked out of the sump section by the pump in the recycling loop and passed to waste through a waste outlet in the recycling loop instead of being recycled.

The apparatus illustrated in FIG. 1 allows hydrogen to be generated on demand and supplied directly to hydrogen-consuming devices such as fuel cells, at the pressures required by the devices. The presence of the buffer tank and the fact that gas can flow freely between the reactor vessel and buffer tank means that fluctuations in gas pressure can be smoothed out and hydrogen can be delivered to the hydrogen-consuming device at a fairly constant pressure. When the apparatus is used in combination with a fuel cell, or where the apparatus contains an on-board fuel cell, a pressure reducer valve may be attached to the inlet of the fuel cell to reduce the hydrogen pressure to the working pressure (typically about 0.5 Bar) of the fuel cell.

Hydrogen is generated by the apparatus of the invention at low pressures and any hydrogen stored in the apparatus after use is stored at low pressure. The risks associated with any hydrogen leakage from the apparatus are therefore significantly reduced and hence the apparatus of the invention is much safer to use under field conditions.

FIGS. 2 to 9 illustrate an embodiment of the invention in which the reactor and other working components are concealed within a casing. In this embodiment, the apparatus comprises a buffer tank 102 upon which is mounted a casing 104.

The buffer tank is formed from 304L grade stainless steel and is able to withstand internal hydrogen pressures of up to 10 bar ($10 \times 105$ Pa). A hydrogen outlet 106 is provided on the buffer tank to enable hydrogen to be taken from the tank. The hydrogen outlet 106 is configured to allow the attachment of a length of tubing to connect the apparatus to a device (such as a PEM fuel cell) that consumes hydrogen. A pressure reducer may be typically provided before or at the hydrogen inlet of the fuel cell to reduce the pressure to the operating pressure (e.g. about 0.5 Bar) of the fuel cell.

The casing 104 is formed from polypropylene or polycarbonate and is secured around a frame into which the buffer tank is placed to create the base of the apparatus. The casing 104 conceals the inner workings of the apparatus which are illustrated in FIGS. 5 to 9. Extending outwardly from the top of the casing 104 is the end of a shaft 108 which forms part of an electric motor-driven mixer. The shaft 108 of the mixer can be rotated manually by means of a hand crank in the event that there is insufficient electricity available to power the mixer.

Set into a recess in an upper surface of the casing is a touch screen electronic interface unit 110 which is used to display various operating parameters of the apparatus such as the pressure of hydrogen generated by the apparatus. An on-off power button 112 is located next to the display screen. In the embodiment shown, the display screen is a touch screen through which the operation of the apparatus can be controlled.

FIGS. 5 to 9 show the apparatus with the outer casing 104 removed to reveal the interior components of the apparatus. Mounted on the buffer tank 102 is a reactor vessel 114 formed from upper 116 and lower 118 stainless steel sections which have abutting Klein® flanges that are secured together by a flange clamp. Alternatively, the size of the flanges can be increased and flange bolts used to secure the two parts of the reactor vessel. A hydrogen gas sealing gasket (not shown) is clamped firmly between the abutting flanges of the upper and lower sections so as to provide a gas-tight seal. By unfastening the clamp (or the flange bolts if present) holding the two sections together, the reactor vessel can be dismantled for cleaning and maintenance purposes.

The reactor vessel is provided with a stirrer having a rotatable shaft 108 which is driven by electric motor 120 (see FIGS. 5 to 9). The electric motor is powered by rechargeable on-board batteries (not shown) and/or the PEM fuel cell or gas generator fuelled by the hydrogen produced by the apparatus. The lower end of the shaft 108 is attached to a stirrer paddle (not shown). The upper end of the shaft 108 extends upwardly out of the motor 120 and can be rotated by hand thereby enabling manual operation of the stirrer, as described above, in the event that battery power is low. To assist manual operation of the stirrer, the upper end of the shaft 108 may be provided with a handle or crank (not shown).

The reactor vessel has a pair of reactant inlets 122, 124 linked by short lengths of tubing to the respective outlets of a pair of peristaltic pumps 126, 128. The peristaltic pumps are powered by a rechargeable on-board battery (not shown) and/or the PEM fuel Cell or generator fuelled by the hydrogen produced by the apparatus. The inlets of the two peristaltic pumps are connected via short lengths of tubing to the reactant containers 130, 132. The reactant containers contain reactants which, when mixed, react to generate hydrogen gas, as described above. The reactants are provided in liquid form so that they can be conveyed to the reaction vessel by the peristaltic pumps.

The reactor vessel has a hydrogen gas outlet 134, a hydrogen bleed valve 136 and a further outlet 138 which is connected via a length of tubing 140 and pressure gauge (not shown) to the buffer tank 102. The hydrogen gas outlet 134 is connected via a length of tubing to a pressure relief valve 142 and then via further lengths of tubing to a first dryer or dewatering device 144 and a second dryer 146. The outlet for the second dryer 146 is connected via a length of tubing to the buffer tank 102.

In use, the apparatus is started up by pressing the on-off switch 112 to activate the programmable computer processing unit (CPU) and its touch activated display screen 110. The user can then select the required hydrogen generation and delivery profile from a menu and activate the apparatus. The two reactants are then pumped from the input containers 130, 132 via the pumps 126, 128 and through the inlets 122, 124 into an in-line mixer 125 and then into the reactor vessel 114. The reactants begin reacting together in the inline mixer 125 and continue reacting inside the reactor vessel 114 to generate hydrogen gas. Mixing of the reactants is assisted using the stirrer which is driven by rotation of the shaft 108. The hydrogen gas generated by the reaction passes out through hydrogen outlet 134 and through, successively, the pressure relief valve 142 and the first and second dryers 144, 146 and into the storage tank. The pressure relief valve 142 is set to release hydrogen to the atmosphere in the event that hydrogen gas pressure within the system exceeds a predetermined value. The first dryer is a water trap which, as the moisture rich hydrogen gas cools, separates the gas from the moisture/water and removes most of the water vapour in the hydrogen. The second dryer, which is typically a desiccant dryer (or absorption dryer), comprises a vessel containing two "towers" or "columns" filled with water-absorbing media such as activated alumina, silica gel, molecular sieves or other desiccant materials. The desiccant materials attract the water from the compressed air via adsorption removing most if not all of the remainder of the water vapour in the hydrogen gas stream.

The apparatus is programmed to deliver the reactants to the reactor vessel at a rate intended to generate a particular pressure of hydrogen. For PEM fuel cells, the hydrogen pressure generated within the apparatus would typically be of the order of about 2-3 bar but a pressure reducer (for example set to about 0.5 Bar) may be connected to the inlet of the PEM cell to reduce the hydrogen pressure to the operating pressure of the PEM cell. The pressure of hydrogen generated by the apparatus is monitored by means of pressure gauges located in the buffer tank 102 and reactor vessel 114 respectively. The pressure gauges are linked electronically to the electronic controller so that the pressures can be displayed on the display screen 110.

The buffer tank 102 functions as described in relation to the embodiment shown in FIG. 1. Thus, it provides a means for absorbing fluctuations in pressure caused the addition of reactants to the reactor vessel and equalising the gas pressures within the different parts of the apparatus. If the overall pressure in the system, as measured by the pressure gauges, is greater than required, the quantities of reactants introduced into the reactor vessel are reduced. Conversely, if the hydrogen pressure is too low, the quantities of reactants introduced into the reactor vessel can be increased. If hydrogen pressure increases too quickly, excess pressure can be released either by the pressure relief valve 142 or by the hydrogen bleed valve 136. In this way, the output hydrogen pressure supplied via outlet 106 to a hydrogen consuming device such as a PEM fuel cell can be matched to the hydrogen pressure requirements of the device, with fine control of the hydrogen pressure entering the PEM cell being achieved using a pressure reducer (e.g. to reduce the pressure to about 0.5 Bar) attached to the inlet of the PEM cell. A temperature sensor (not shown) is typically mounted inside the reactor vessel or on an exterior surface of the reactor vessel. The temperature gauge is also linked to the electronic controller. In the event that the temperature inside the reactor vessel increases too quickly, the flow of reactants into the reactor vessel can be halted or reduced.

Figure 5:
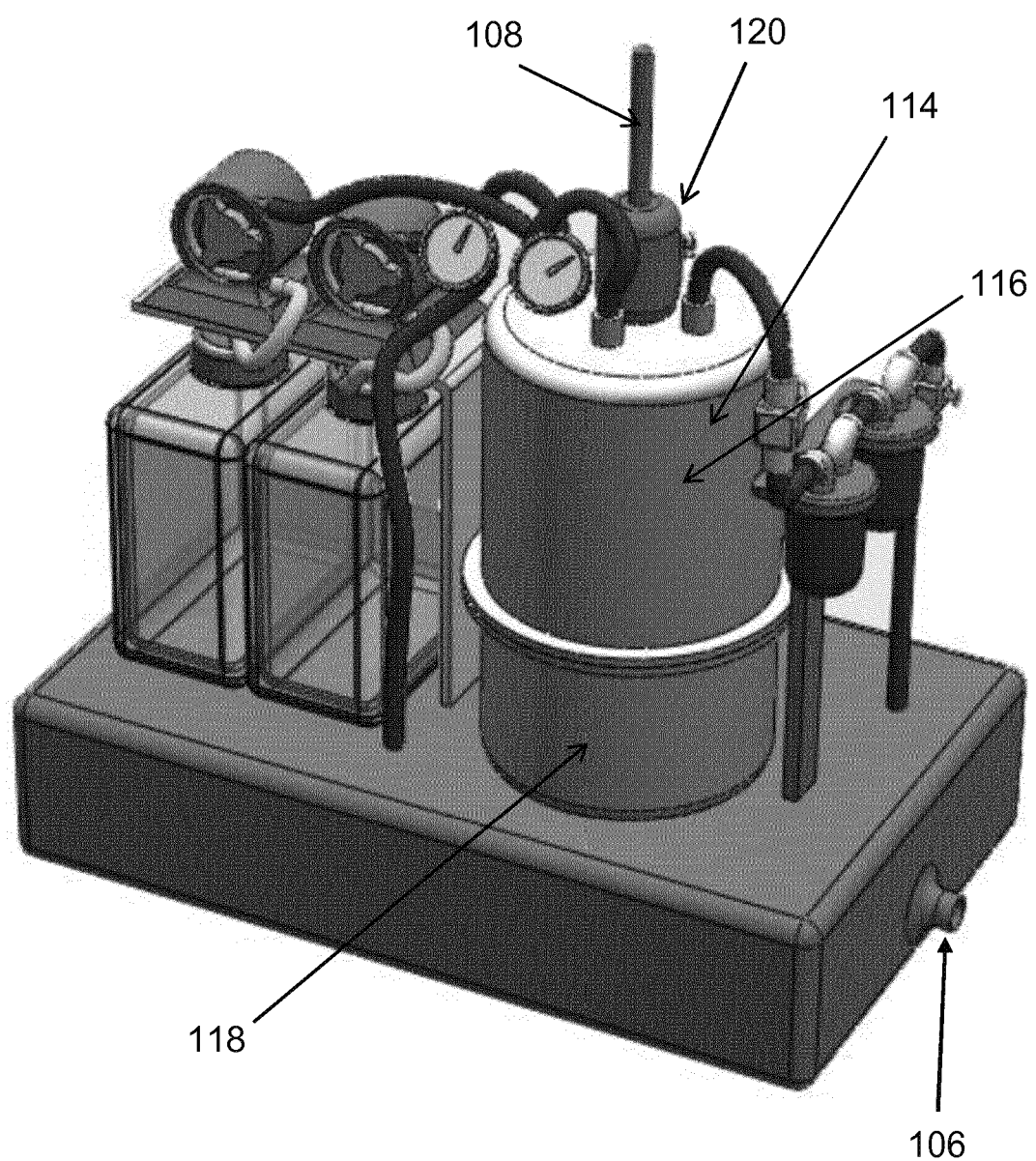
FIG. 5 is a perspective view of the apparatus of FIGS. 2 to 4 but with the outer casing removed.
Figure 6:
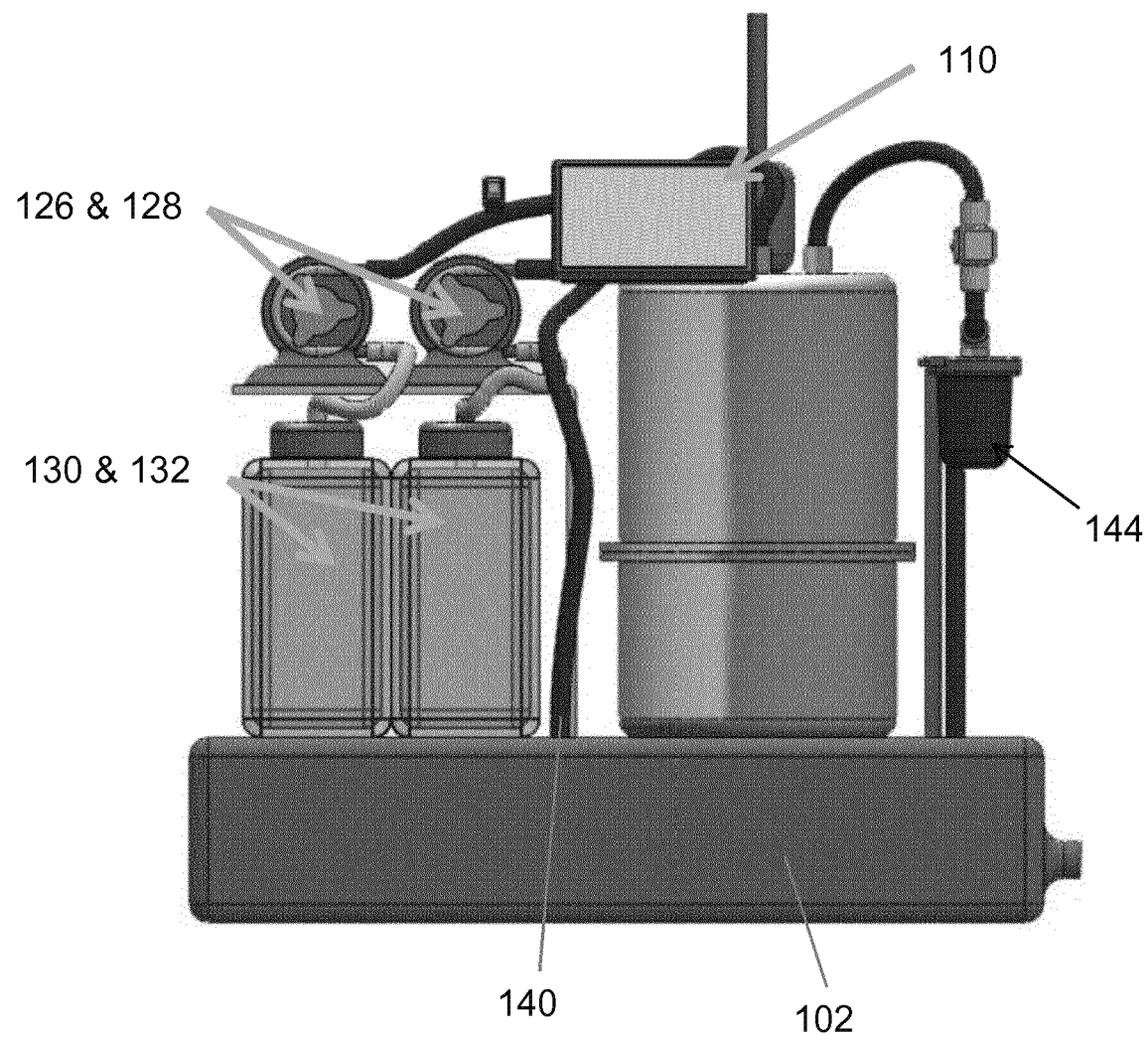
FIG. 6 is a front elevation of the apparatus of FIGS. 2 to 4 but with the outer casing removed.
Figure 7:
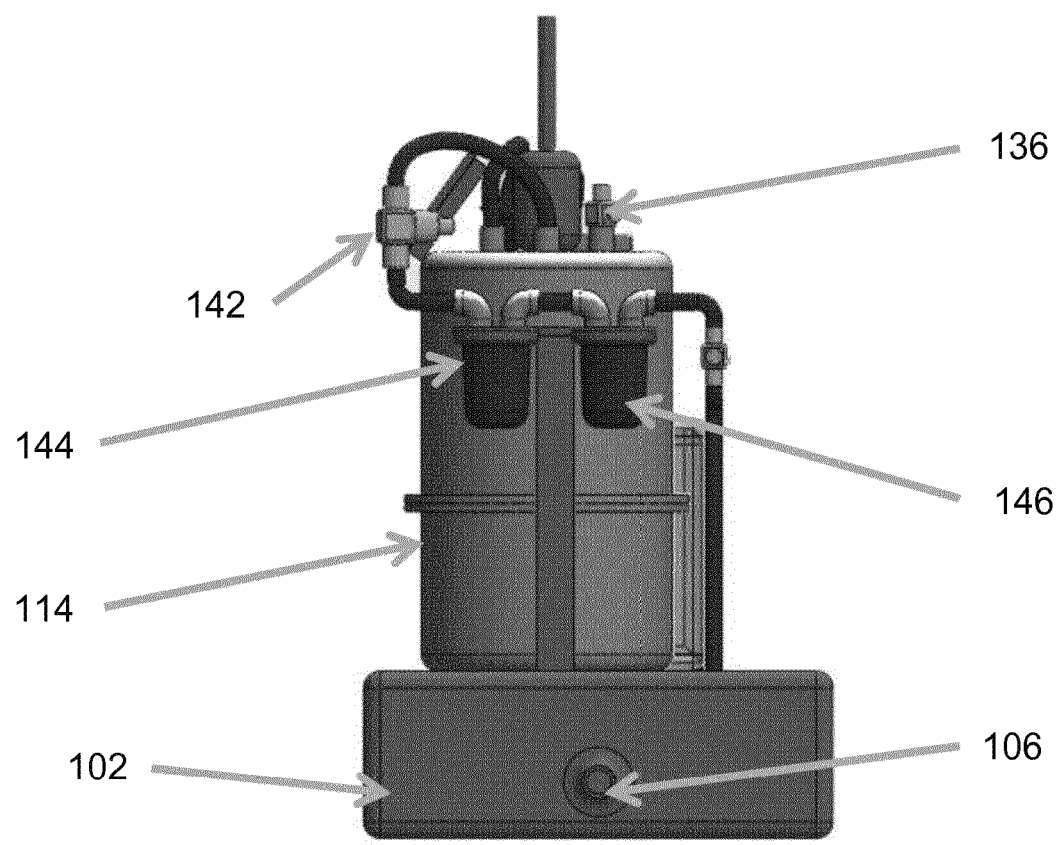
FIG. 7 is a right side elevation of the apparatus of FIGS. 2 to 4 but with the outer casing removed.
Figure 8:
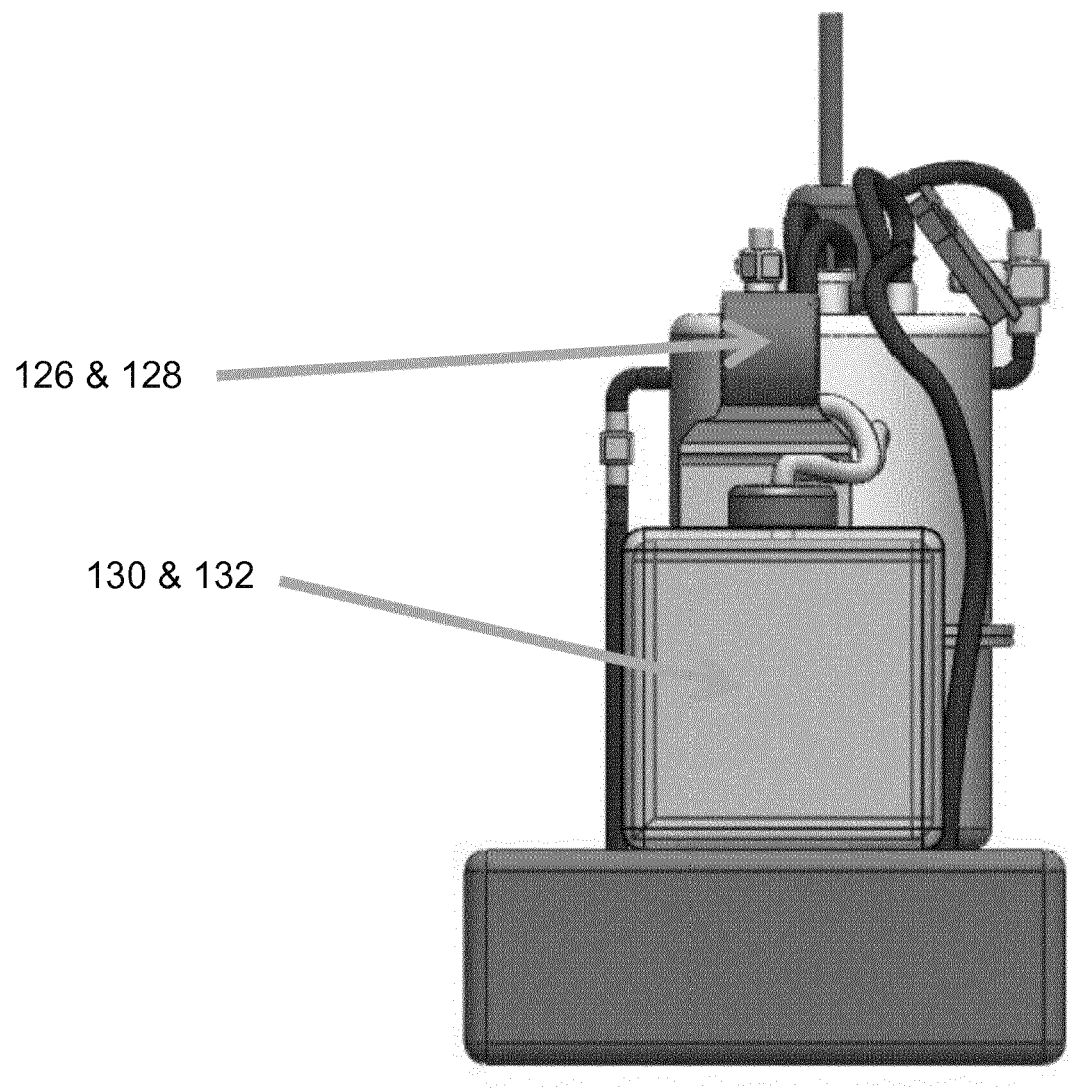
FIG. 8 is a left side elevation of the apparatus of FIGS. 2 to 4 but with the outer casing removed.
Figure 9:
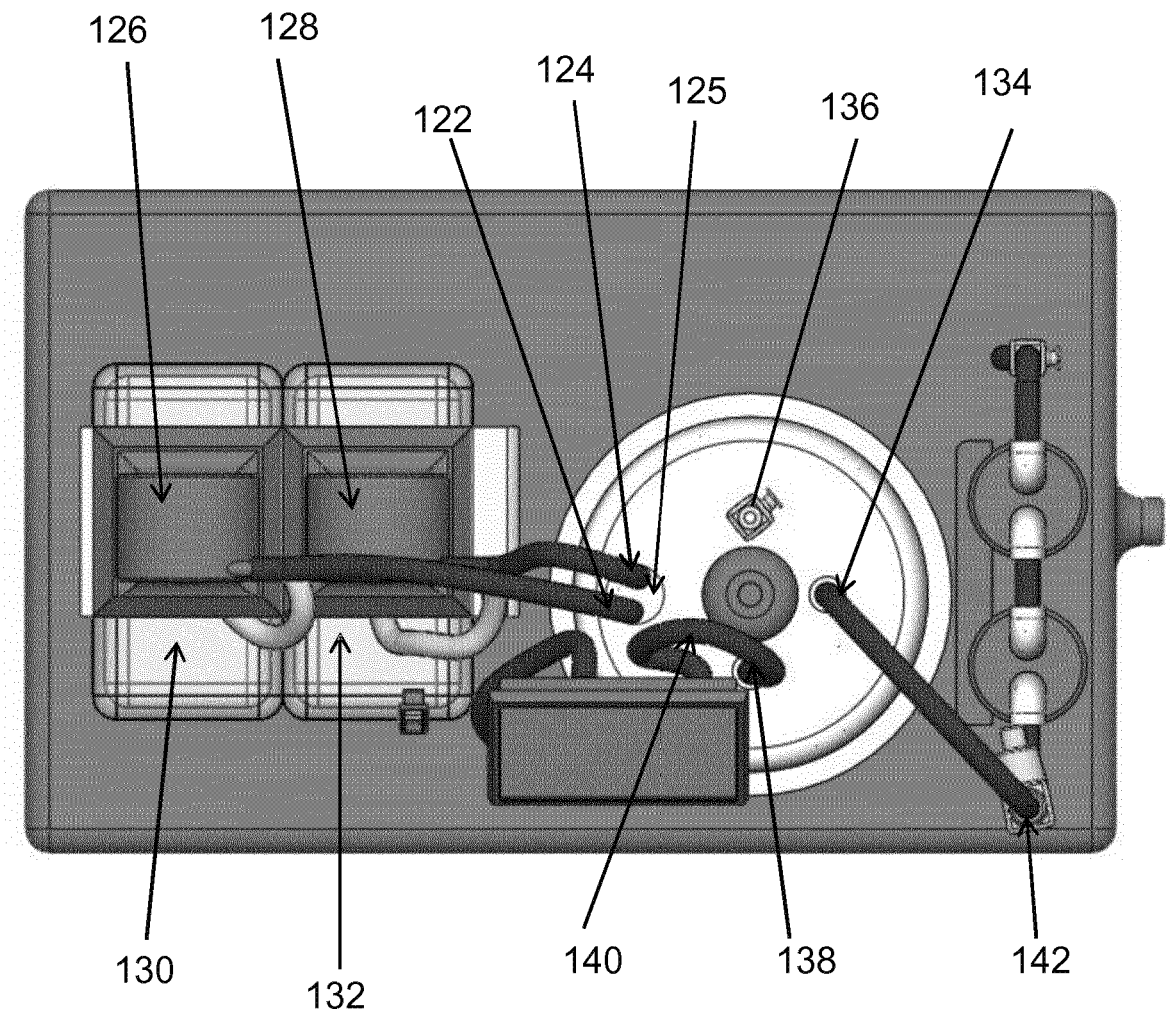
FIG. 9 is a top elevation of the apparatus of FIGS. 2 to 4 but with the outer casing removed.

Preferably, the pressures and temperatures measured by the pressure gauges and temperature sensors are displayed on the interface unit 110. However, pressure and temperature may also be displayed on dials mounted on the casing 104. Two such dials (one for temperature and the other for displaying pressure) are shown in FIG. 5.

The apparatus has on-board rechargeable batteries for alternative powering the stirrer motor, in-line mixer and peristaltic pumps if the PEM or generator are not providing adequate power. The stirrer motor, in-line mixer and peristaltic pumps are set up to operate at very low power settings and are not in continuous operation. Thus the on-board batteries need to be recharged relatively infrequently. Where necessary, some of the electricity generated by the fuel cells or generator to which the apparatus is connected can be used for recharging the batteries. To reduce power consumption still further, the apparatus can be set up so that stirring of the reactants in the reactor vessel is carried out entirely by hand without using the electric motor 120.

The apparatus of the invention is portable, i.e. it is of a size and weight that enable it to be moved easily by one or two people of average strength. Thus, purely by way of illustration, the total height of the apparatus (including the storage tank and casing) can be 450 mm, the width (or length) in one horizontal direction can be 460 mm and the width (or length) in the orthogonal horizontal direction can be 280 mm. It will be appreciated however that these dimensions can be varied as required. Also by way of example, excluding the weight of the reactants, the weight of an apparatus having the aforementioned dimensions can be from about 15 kg to about 150 kg, for example about 27 kg.

The working parts of the apparatus are protected by the outer casing 104 which can be made from a metal material but more typically is made from a tough plastics material such as an appropriate grade of polypropylene or polycarbonate. The outer casing may advantageously be provided with handles, or handle-like formations (not shown) to assist in the lifting of the apparatus.

The chemical reaction between the reactants typically gives rise to waste products such as aluminium hydroxide and sodium aluminate that will gradually build up in the bottom of the reactor vessel and will need to be removed from time to time. To do this, the upper and lower sections of the reactor vessel can be separated and the waste products scraped out of the lower section.

Figure 10:
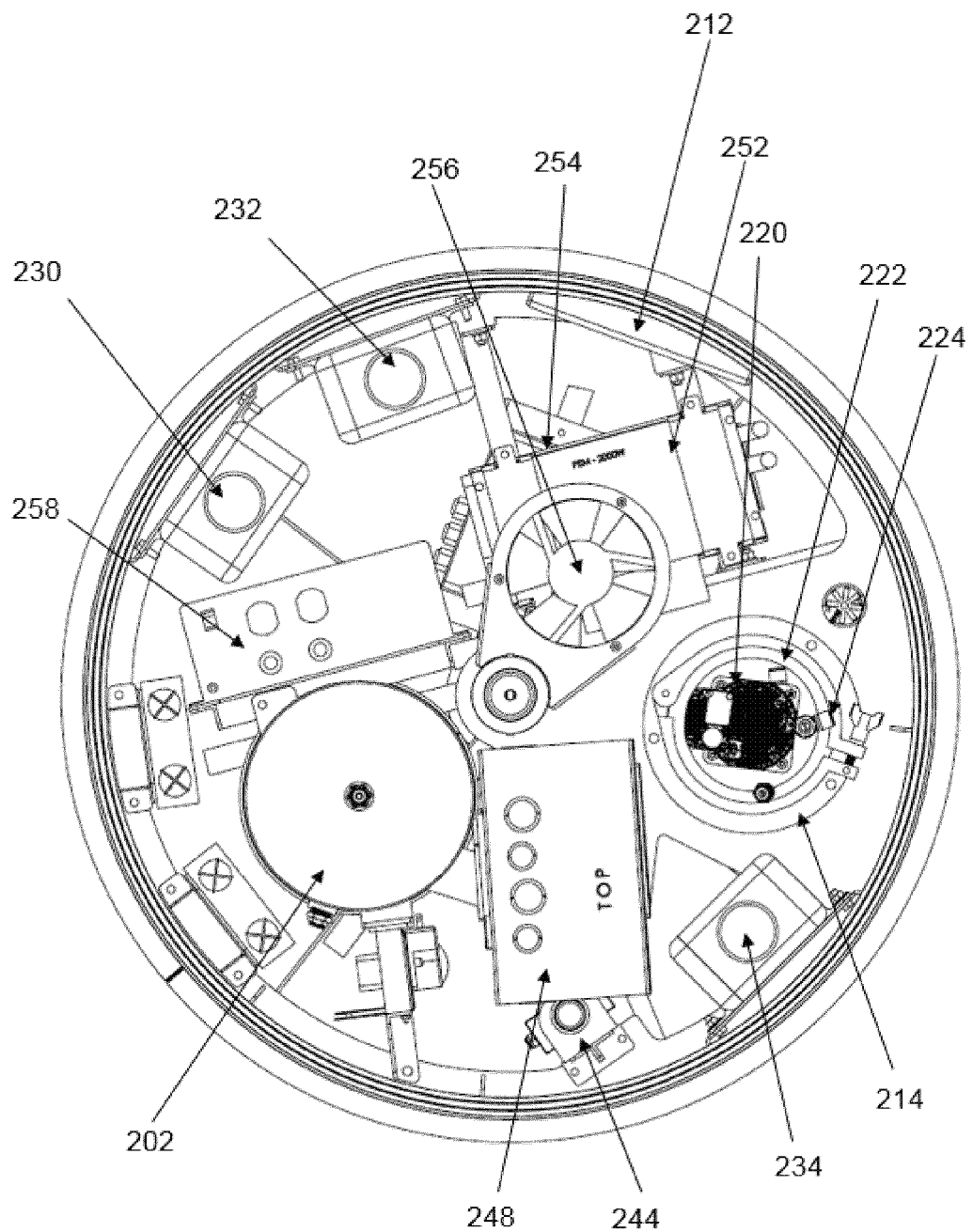
FIG. 10 is a top view of an apparatus according to a third embodiment of the invention, with part of the casing removed.
Figure 11:
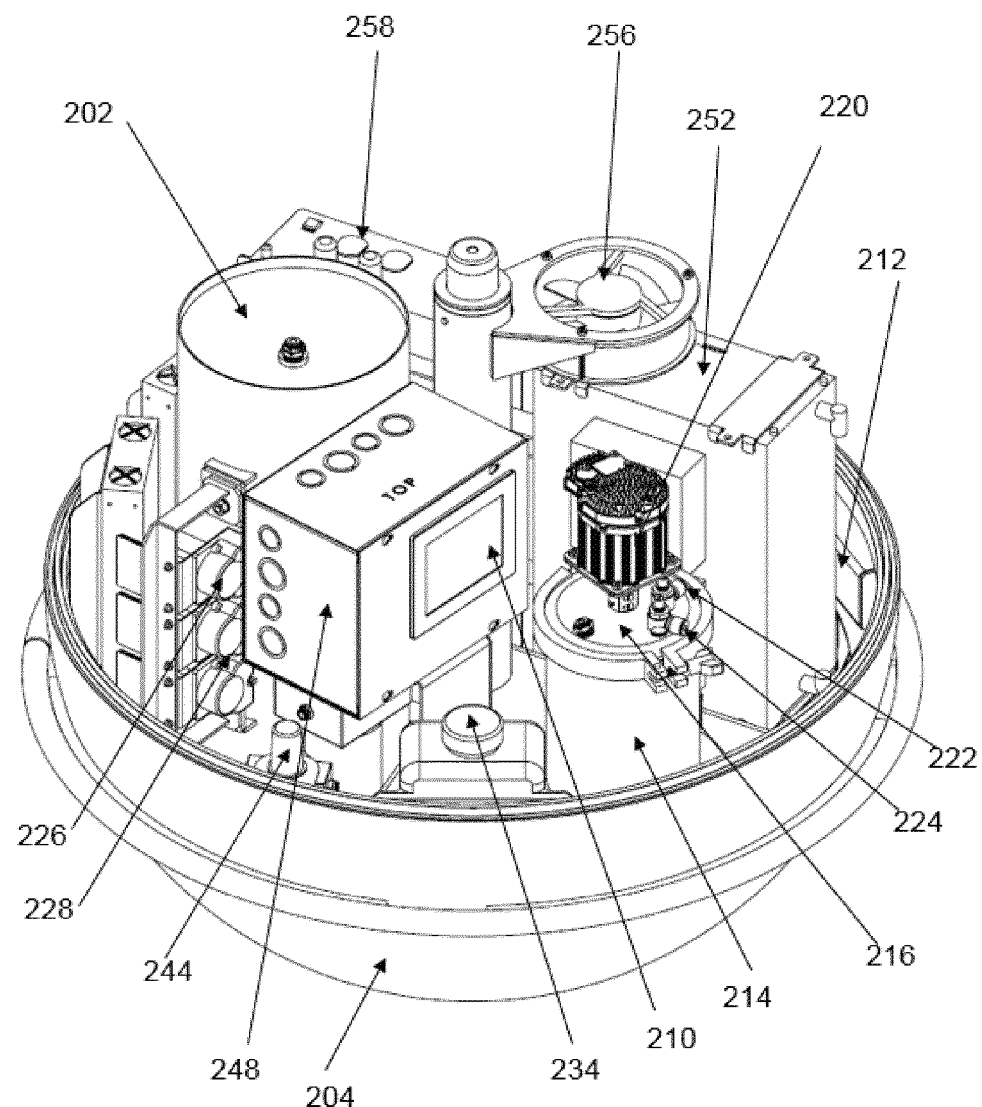
FIG. 11 is a perspective view from one side of the apparatus of FIG. 10, with part of the casing removed.
Figure 12:
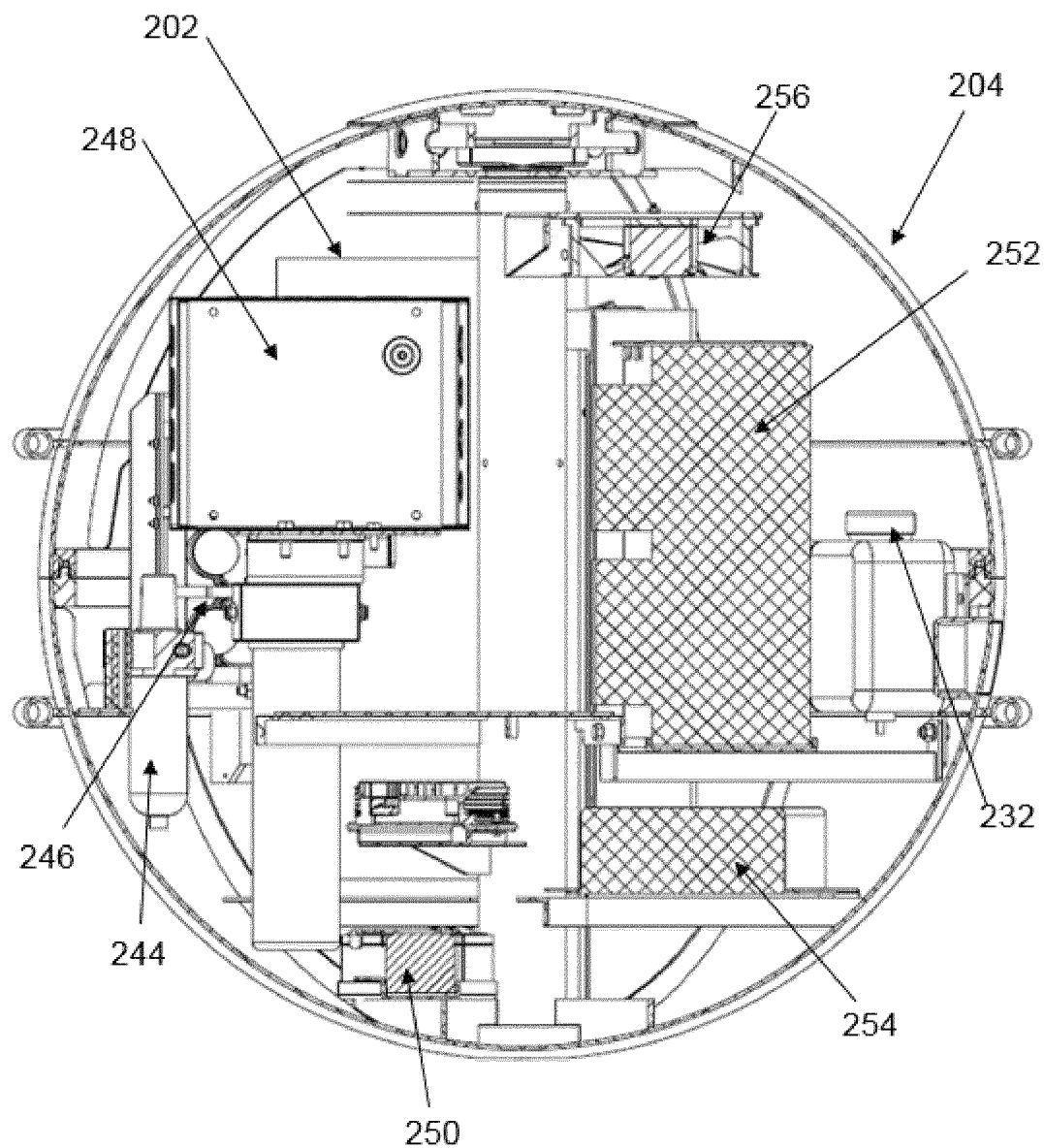
FIG. 12 is a cross-sectional side view of the apparatus of FIG. 10.

FIGS. 10 to 12 illustrate a further embodiment of the invention in which the reactor and other working components are concealed within a substantially spherical casing which allows the apparatus to be moved by rolling.

In this embodiment, the apparatus comprises a buffer tank 202 mounted within substantially spherical casing 204. The buffer tank is formed from 304L grade stainless steel and is able to withstand internal hydrogen pressures of up to 10 bar ($10\times10^5$ Pa). A hydrogen outlet (not shown) is provided on the buffer tank to enable hydrogen to be taken from the tank. The hydrogen outlet is connected via a length of tubing and pressure reducer (not shown) to a PEM fuel cell 252.

The apparatus also comprises a display screen 210 contained within the casing. In the embodiment shown, the display screen is a touch screen through which the operation of the apparatus can be controlled. Further to the display screen, set into a recess in a surface of the casing are on/off buttons 212, which allow the user to start or stop the generation of hydrogen without having to open the casing.

Also, mounted within the casing is a reactor vessel 214 having a lid 216. The lid and reactor vessel have abutting Klein® flanges that are secured together by a flange clamp. A hydrogen gas sealing gasket (not shown) is clamped firmly between the abutting flanges of the upper and lower sections so as to provide a gas-tight seal. By unfastening the clamp holding the lid onto the reactor vessel, the reactor vessel can be dismantled for cleaning and maintenance purposes.

The reactor vessel is provided with a stirrer having a rotatable shaft which is driven by electric motor 220. The electric motor is powered by rechargeable on-board batteries 250 and/or the PEM fuel cell 252 fuelled by the hydrogen produced by the apparatus. The lower end of the shaft is attached to a stirrer paddle (not shown).

The reactor vessel has a pair of reactant inlets 222, 224 linked by short lengths of tubing to the respective outlets of a pair of peristaltic pumps 226, 228. The peristaltic pumps are powered by a rechargeable on-board battery 250 and/or the PEM fuel cell 252 or generator fuelled by the hydrogen produced by the apparatus. The inlets of the two peristaltic pumps are connected via short lengths of tubing to the reactant containers 230, 232. The reactant containers 230, 232 contain reactants which, when mixed, react to generate hydrogen gas, as described above. The reactants are provided in liquid form so that they can be conveyed to the reaction vessel by the peristaltic pumps.

The reactor vessel has a hydrogen gas outlet and a further outlet which is connected via a length of tubing and pressure gauge (not shown) to the buffer tank 202. The hydrogen gas outlet is connected via a length of tubing to a first dryer or dewatering device 244 and a second dryer 246. The outlet for the second dryer 246 is connected via a length of tubing to the buffer tank 202.

The reactor vessel is also provided with a waste outlet at its base for removing waste reaction product and/or unreacted reactants. These may be recycled back into the reactor through a length of tubing or alternatively carried away through a separate length of tubing to waste container 234.

In use, the apparatus is started up by pressing the on-off switch 212 to activate the programmable computer processing unit (CPU) 248 and its touch activated display screen 210. The user can then select the required hydrogen generation and delivery profile from a menu and activate the apparatus. The two reactants are then pumped from the input containers 230, 232 via the pumps 226, 228 and through the inlets 222, 224 on the reactor vessel 114. The reactants begin reacting inside the reactor vessel 214 to generate hydrogen gas. Mixing of the reactants is assisted using the stirrer which is driven by rotation of the shaft. The hydrogen gas generated by the reaction passes out through hydrogen outlet and through, successively, first and second dryers 244, 246 and into the buffer tank 202. The first dryer is a water trap which, as the moisture rich hydrogen gas cools, separates the gas from the moisture/water and removes most of the water vapour in the hydrogen. The second dryer, which is typically a desiccant dryer (or absorption dryer), comprises a vessel containing two "towers" or "columns" filled with water-absorbing media such as activated alumina, silica gel, molecular sieves or other desiccant materials. The desiccant materials attract the water from the compressed air via adsorption removing most if not all of the remainder of the water vapour in the hydrogen gas stream.

The apparatus is programmed to deliver the reactants to the reactor vessel at a rate intended to generate a particular pressure of hydrogen. For PEM fuel cells, the hydrogen pressure would typically be of the order of less than about 3 bar (for example in the range from 0.5 Bar to 3 Bar). The pressure of hydrogen generated by the apparatus is monitored by means of a pressure gauge located in the length of tubing between buffer tank 202 and reactor vessel 214 respectively. The pressure gauge is linked electronically to the electronic controller 248 so that the pressures can be displayed on the display screen 210. A pressure reducer is connected to the gas inlet of the PEM cell to limit the pressure of hydrogen entering the cell to the cell's operating pressure, typically about 0.5 Bar.

The buffer tank 202 functions as described in relation to the embodiment shown in FIG. 1. Thus, it provides a means for absorbing fluctuations in pressure caused the addition of reactants to the reactor vessel and equalising the gas pressures within the different parts of the apparatus. If the overall pressure in the system, as measured by the pressure gauges, is greater than required, the quantities of reactants introduced into the reactor vessel are reduced. Conversely, if the hydrogen pressure is too low, the quantities of reactants introduced into the reactor vessel can be increased. In this way, the output hydrogen pressure supplied to a hydrogen consuming device such as a PEM fuel cell can be matched to the hydrogen pressure requirements of the device. A temperature sensor (not shown) is typically mounted inside the reactor vessel 214 or on an exterior surface of the reactor vessel. The temperature gauge is also linked to the CPU 248. In the event that the temperature inside the reactor vessel increases too quickly, the flow of reactants into the reactor vessel can be halted or reduced.

Preferably, the pressures and temperatures measured by the pressure gauges and temperature sensors are displayed on the interface unit 210.

The apparatus has on-board rechargeable batteries 250 for alternative powering the stirrer motor, in-line mixer and peristaltic pumps if the PEM or generator are not providing adequate power. The stirrer motor, in-line mixer and peristaltic pumps are set up to operate at very low power settings and are not in continuous operation. Thus the on-board batteries need to be recharged relatively infrequently. Where necessary, some of the electricity generated by the fuel cells or generator to which the apparatus is connected can be used for recharging the batteries. To reduce power consumption still further, the apparatus can be set up so that stirring of the reactants in the reactor vessel is carried out entirely by hand without using the electric motor 220.

In the embodiment shown in FIGS. 10 to 12, the casing accommodates a proton membrane exchange (PEM) fuel cell 252 for converting the generated hydrogen into electrical power and its associated controller 254. The fuel cell is provided with an inlet for hydrogen and a waste fluid outlet. The hydrogen inlet for the PEM cell is provided with a pressure reducing valve to regulate the input pressure of hydrogen to the operating pressure of the cell, e.g. about 0.5 Bar. The fluid stream from the hydrogen outlet can then be recycled and fed back into the PEM cell, to derive further power from any hydrogen still present in the fluid stream, or can be exhausted to the atmosphere.

The casing may also contain a fan 256 as a cooling means to prevent the apparatus from overheating. The fan is located above the PEM cell to allow for circulation of air to prevent the PEM cell from overheating. The casing may also contain air escape holes to aid air circulation and improve cooling efficiency.

The apparatus is also provided with a DC/AC power invertor 258. As the PEM cell produces direct current (DC), the invertor converts this electrical current to alternating current (AC) which may be more suitable for devices using the power generated by the apparatus.

The working parts of the apparatus are protected by the outer casing 204 which can be made from a metal material such as aluminium. The outer casing may advantageously be provided with handles or rails to assist in the moving (e.g. rolling and/or lifting) of the apparatus. The outer casing may also be provided with retractable stabilising legs (not shown) to hold the apparatus in an upright orientation during use.

The embodiments described above and illustrated in the accompanying figures and tables are merely illustrative of the invention and are not intended to have any limiting effect. It will readily be apparent that numerous modifications and alterations may be made to the specific embodiments shown without departing from the principles underlying the invention. All such modifications and alterations are intended to be embraced by this application

The invention claimed is:

1. An apparatus for generating hydrogen; the apparatus comprising:
   (a) a reactor vessel;
   (b) first and second reactant containers linked to the reactor vessel, the first and second reactant containers containing, respectively, first and second reactants which, when mixed, react to form hydrogen gas;
   (c) one or more peristaltic pumps for pumping the first and second reactants from the reactant containers to the reactor vessel so that the reactants mix and react to form hydrogen gas, the peristaltic pumps being selected to provide a maximum pumping pressure in the range from 0.1 bar to 10 bar;
   (d) a buffer tank for receiving hydrogen gas from the reactor vessel;
   (e) a pressure sensor for measuring pressure of hydrogen gas within the apparatus; and
   (f) electronic control means for controlling operation of the apparatus, the electronic control means being in communication with the one or more pumps and the pressure sensor and being programmed to control the flow of reactants to the reactor vessel so as to maintain the pressure of hydrogen gas within the apparatus at a value of no more than 10 bar.

2. The apparatus according to claim 1 wherein the peristaltic pumps are pumps that can no longer pump reactant into the reactor vessel if the pressure inside the reactor vessel should exceed a predetermined value.

3. The apparatus according to claim 1, wherein the pressure of hydrogen within the apparatus is maintained within a range from 0.5 bar to 5 bar.

4. The apparatus according to claim 1 wherein the buffer tank has a volume which is at least 1.5 times the volume of the reactor vessel.

5. The apparatus according to claim 4 wherein the volume ratio of the buffer tank:reactor vessel is in the range from 1.5:1 to 2.5:1.

6. The apparatus according to claim 4, comprising:
   an outlet of the reactor vessel connected to an inlet of the buffer tank via line;
   wherein the line is absent any one-way valves, enabling hydrogen gas to flow in both directions between the reactor vessel and the buffer tank.

7. The apparatus according to claim 1 wherein the electronic control means has been programmed to control the flow of reactants to the reactor vessel so that the pressure of hydrogen gas within the apparatus does not exceed 5 bar.

8. The apparatus according to claim 1 wherein the peristaltic pumps (c) have a maximum pumping pressure no greater than 3 bar.

9. The apparatus according to claim 1 which is further provided with at least one temperature sensor (g), wherein the temperature sensor is in communication with the electronic control means (g); and wherein the electronic control means (g) is programmed to control the flow of reactants to the reactor vessel so that a defined temperature parameter of the apparatus does not exceed a pre-determined value.

10. The apparatus according to claim 1 which further comprises a casing (h), wherein the reactor vessel (a), the first and second reactant containers (b), the one or more peristaltic pumps (c), the pressure sensor (e), the electronic control means (f) and optionally the buffer tank (d) are all contained within the casing (h).

11. The apparatus according to claim 1 wherein the apparatus further comprises an outer casing that is spherical or cylindrical in shape.

12. The apparatus according to claim 1 wherein the apparatus has an empty weight of up to 25 kg.

13. The apparatus according to claim 1 wherein the apparatus has a maximum width of up to 1.5 metres, a maximum length of up to 1.5 meters and a maximum height of up to 1.5 metres.

14. The apparatus according to claim 1 which further comprises one or more dryer units (dewatering units) (i) for removing water vapour from the hydrogen before it enters the buffer tank.

15. The apparatus according to claim 1 which further comprises a hydrogen-consuming device for generating electricity.

16. The apparatus according to claim 15 wherein the hydrogen-consuming device is a fuel cell.

17. The apparatus according to claim 16 wherein the fuel cell is a PEM fuel cell.

18. The apparatus according to claim 17 wherein the PEM fuel cell is provided with a pressure reducing valve to reduce the pressure of hydrogen entering the PEM cell to an operating pressure thereof.

19. The apparatus according to claim 18 wherein the pressure reducing valve reduces the pressure of hydrogen entering the PEM cell to about 0.5 bar.

20. A method of generating hydrogen, which method comprises bringing first and second reactants together in a reactor vessel using an apparatus as defined in claim 1.

* * * * *